(12) United States Patent
Karas

(10) Patent No.: US 12,078,384 B2
(45) Date of Patent: Sep. 3, 2024

(54) AIR CONDITIONING UNIT

(71) Applicant: Houghton Leisure Products Pty Ltd, Kilkenny (AU)

(72) Inventor: Andrew Robert Karas, Kilkenny (AU)

(73) Assignee: HOUGHTON LEISURE PRODUCTS PTY LTD, Kilkenny (AU)

( * ) Notice: Subject to any disclaimer, the term of this patent is extended or adjusted under 35 U.S.C. 154(b) by 0 days.

(21) Appl. No.: 17/885,576

(22) Filed: Aug. 11, 2022

(65) Prior Publication Data
US 2023/0054677 A1 Feb. 23, 2023

(30) Foreign Application Priority Data

Aug. 11, 2021 (AU) ................................ 2021215183

(51) Int. Cl.
*F24F 13/24* (2006.01)
*B60H 1/00* (2006.01)
*B60H 1/24* (2006.01)
*B60H 1/32* (2006.01)

(52) U.S. Cl.
CPC ......... *F24F 13/24* (2013.01); *B60H 1/00021* (2013.01); *B60H 1/245* (2013.01); *B60H 1/3202* (2013.01)

(58) Field of Classification Search
CPC .... F24F 13/24; F24F 1/0022; B60H 1/00021; B60H 1/245; B60H 1/3202; B60H 2001/00235; B60H 1/00457
See application file for complete search history.

(56) References Cited

U.S. PATENT DOCUMENTS

| | | | | |
|---|---|---|---|---|
| 3,766,750 A | * | 10/1973 | Aoh .................. | F24F 1/035 62/426 |
| 6,763,669 B1 | * | 7/2004 | Bushnell ............ | B60H 1/00371 62/115 |
| 2002/0177400 A1 | * | 11/2002 | Asahina ............. | F24F 13/222 454/233 |
| 2020/0086717 A1 | * | 3/2020 | Bei .................... | B60H 1/00364 |

FOREIGN PATENT DOCUMENTS

AU          2017403949 A1      11/2018

* cited by examiner

*Primary Examiner* — David J Teitelbaum
(74) *Attorney, Agent, or Firm* — Bayramoglu Law Offices LLC

(57) ABSTRACT

An air conditioning unit includes a conditioning chamber, a fan with a fan air input and a fan air output, and an evaporative unit. The fan and the evaporative unit are arranged in the conditioning chamber. The fan draws in entry air to enter the air conditioning unit, then through the evaporative unit, to condition the entry air to produce conditioned air. Within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to being redirected downwards and through the evaporative unit.

13 Claims, 6 Drawing Sheets

AIR CONDITIONING UNIT

CROSS REFERENCE TO THE RELATED APPLICATIONS

The present application is based upon and claims priority to Australian Patent Application No. 2021215183 filed on Aug. 11, 2021, the entire content of which is hereby incorporated by reference.

TECHNICAL FIELD

The present disclosure relates to a ceiling air conditioning unit, which can be installed in a building or on a vehicle.

BACKGROUND

It is common to include an air conditioning unit in a vehicle, such as a car, van, ute, truck, bus, motorhome, caravan, boat etc. The aim is to provide a cooling effect or heating effect when desired. An air conditioning unit normally includes a compressor, a condenser, a fan for the condenser, an evaporator, and a fan for the evaporator. The scientific principle of the working of an air conditioning unit is well known. For a ceiling air conditioning unit, part or the entire unit is mounted on top of a ceiling of a vehicle. Such a ceiling air conditioning unit can be used inside of a building. Sometimes it is also known as a cassette air conditioner.

The noise generated by such a unit or system is often at an unsatisfactory level, thus affecting or disturbing a person within a vehicle or a room. Embodiments disclosed herewith offers alternatives to those existing ceiling air conditioning units.

SUMMARY

According to an aspect of the present disclosure, there is provided an air conditioning unit, comprising: a conditioning chamber; a fan, in the conditioning chamber, with a fan air input and a fan air output; and an evaporative unit, in the conditioning chamber; wherein the fan draws in entry air to enter the air conditioning unit, then through the evaporative unit, to condition the entry air to produce conditioned air; and wherein, within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to being redirected downwards and through the evaporative unit.

In one form, an average base of the fan is higher than half of an average height of the evaporative unit. In one form, the air conditioning unit further comprises an air tunnel and a plenum; wherein the air tunnel connects the fan air input to the plenum; the plenum comprises a plenum air input and a plenum air output; wherein the entry air goes through the plenum air input to the fan; and wherein the conditioned air goes through the plenum air output as an output of the air conditioning unit.

In one form, a space is provided between the air tunnel and the evaporative unit to decrease noise due to flow of the conditioned air from the evaporative unit towards the plenum air output. In one form, a thickness of the plenum is reduced to less than 3 cm thick without increasing the overall noise of the air conditioning unit.

In one form, the evaporative unit is fitted with evaporative coils surrounding at least 75% the fan when viewed from a top of the air conditioning unit.

In one form, the evaporative unit comprises two separated sets of coils. In one form, the two separated sets are opposing each other with the fan in between, when viewed from a top of the air conditioning unit.

In one form, the fan is a centrifugal fan, and wherein a top of the centrifugal fan touches a top inner surface of the conditioning chamber.

In one form, the fan is an axial fan, and wherein a space is provided between a top of the axial fan and a top inner surface of the conditioning chamber.

In one form, the evaporative unit comprises coils with five or more rows to reduce condensate generation when a relative humidity of the entry air drops below 50%.

According to an aspect of the present disclosure, there is provided an air conditioning unit of a vehicle, comprising: a conditioning chamber mounted on top of a ceiling of the vehicle; a fan, in the conditioning chamber, with a fan air input and a fan air output; an evaporative unit, in the conditioning chamber; an air tunnel; and a plenum mounted at a bottom of the ceiling; wherein the fan draws in entry air to enter the air conditioning unit, then through the evaporative unit, to condition the entry air to produce conditioned air; wherein, within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to being redirected downwards and through the evaporative unit; and wherein the air tunnel connects the fan air input to the plenum; the plenum comprises a plenum air input and a plenum air output; wherein the entry air goes through the plenum air input to the fan; and wherein the conditioned air goes through the plenum air output as an output of the air conditioning unit.

In one form, the fan is a centrifugal fan, and wherein a top of the centrifugal fan touches a top inner surface of the conditioning chamber.

In one form, the fan is an axial fan, wherein a space is provided between a top of the axial fan and a top inner surface of the conditioning chamber.

BRIEF DESCRIPTION OF THE DRAWINGS

Embodiments of the present invention will be discussed with reference to the accompanying drawings wherein.

While the figures only show one embodiment, the description includes many other embodiments. In the following description, like reference characters designate like or corresponding parts throughout the figures.

DETAILED DESCRIPTION OF THE EMBODIMENTS

Figure 6:
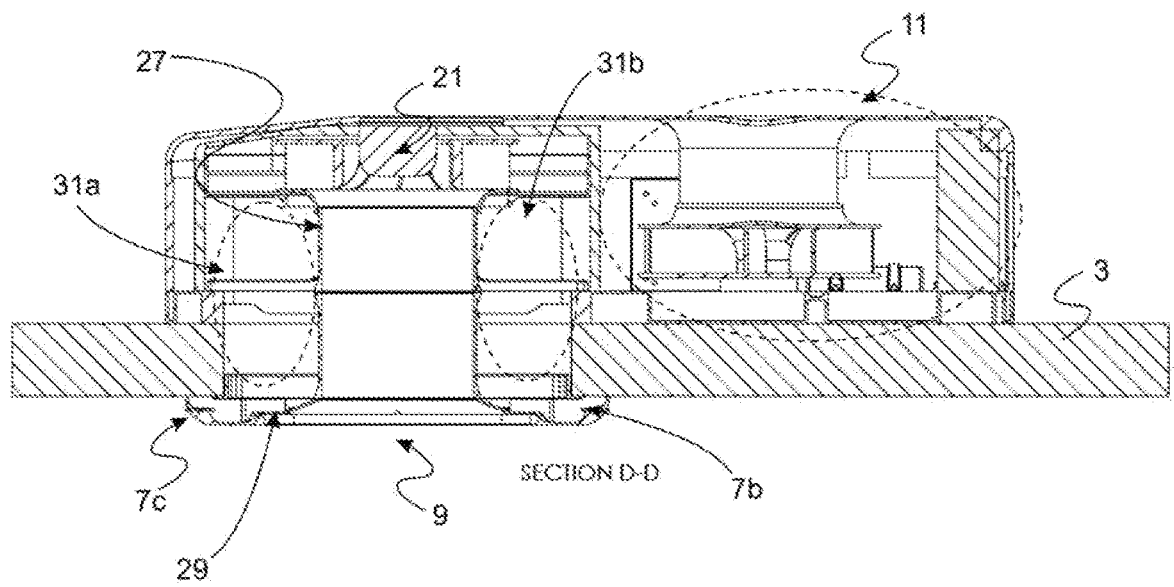
FIG. 6 depicts a cross sectional area D-D of the embodiment of FIG. 1.

Note that in this specification, unless stated otherwise, the orientation of an air conditioning unit is always with reference to the upright orientation when installed on a ceiling. The ceiling can be a room ceiling, or a ceiling of a vehicle. For example, FIG. 6 shows an air conditioning unit installed on a ceiling at an upright position. In relation to relative direction, unless stated otherwise, vertical and horizontal are both in relation to a horizontal ground level.

The general principle of an air conditioning unit is well known. Generally, an air conditioning system uses a forced circulation and phase change of a refrigerant between gas and liquid to transfer heat, and comprises a condensing system, an evaporative system, and a compressor. In the evaporative system, evaporation occurs when heat is absorbed, and in the condensing system condensation occurs when heat is released. The compressor causes pressure changes between two compartments, and actively pumps a refrigerant around an enclosed system. In a cooling operation, the refrigerant is pumped into the evaporative system. Low pressure then causes the refrigerant to evaporate taking the heat with it. In the condensing compartment, the refrigerant vapour is compressed and forced through another heat exchange coil, condensed into a liquid which then rejects the heat previously absorbed from the cooled space along with the waste heat from the compressor. The condensing system and the evaporative system may be included in a single unit, or may be separated. A valve can be added to reverse the entire operation, so that the cooling operation may be replaced by a heating operation. For a succinct discussion, the disclosure herein focuses on a cooling operation. However, the same principle can be applied to a heating operation.

In a general form of the present disclosure, there is provided an air conditioning unit, comprising: a conditioning chamber, a fan, and an evaporative unit in an evaporative system of the air conditioning unit. An external condensing system may be connected to the air conditioning unit or may be included in the air conditioning unit. The term conditioning chamber may also be known as an evaporative chamber where the refrigerant is evaporated in a cooling operation. The fan may be an axial fan or a centrifugal fan, or any form of hybrid fan suitable for the present disclosure to direct air into the conditioning chamber and eject air from the conditioning chamber. The evaporative unit is often in a form of multiple evaporative fins, coils or columns with slits or openings within the conditioning chamber, which allows air to flow through and allows heat exchange to happen between the evaporative fins, coils or columns and the air flowing through the evaporative fins, coils or columns.

Within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to being redirected downwards and through the evaporative unit. In the case of the centrifugal fan, a top of the centrifugal fan touches a top inner surface of the conditioning chamber. Since at least 30% of an area of the centrifugal fan air output are positioned above an average top surface of the evaporative unit, at least 30% of the air from the centrifugal fan output is directed towards a wall of the conditioning chamber prior to redirected downwards and through the evaporative unit, and not obstructed by any wall or structure within the conditioning chamber. This is different from known arts, where air from the centrifugal fan directly flows through evaporative unit surrounding the centrifugal fan. Another known art uses indirect air flow between a fan and the evaporative unit. However, there exists a wall between the fan air output and the evaporative unit. In another embodiment, only a part of the area of the fan air output is required to be positioned above an average top surface of the evaporative unit, and that air from the part of the area of the fan air output is directed towards a wall of the conditioning chamber prior to being redirected downwards and through the evaporative unit.

In this specification, a centrifugal fan is a mechanical device for moving air. Sometimes, a centrifugal fan is also known as a "blower" and "squirrel cage fan". A centrifugal fan generally draws air in a first direction and ejects air radially in directions perpendicular to the first direction. Often, a centrifugal fan includes a centrifugal fan wheel positioned within a housing. The centrifugal fan wheel ejects the air radially and the housing directs the air in a desired direction through an opening.

In the case of the axial fan, a space is provided between a top of the axial fan and a top inner surface of the conditioning chamber. The top surface of the axial fan is above the top surface of an average top surface of the evaporative unit. The air from the axial fan will hit the top inner surface of the conditioning chamber directly and be redirected sideways and downwards through the evaporative unit.

Figure 1:
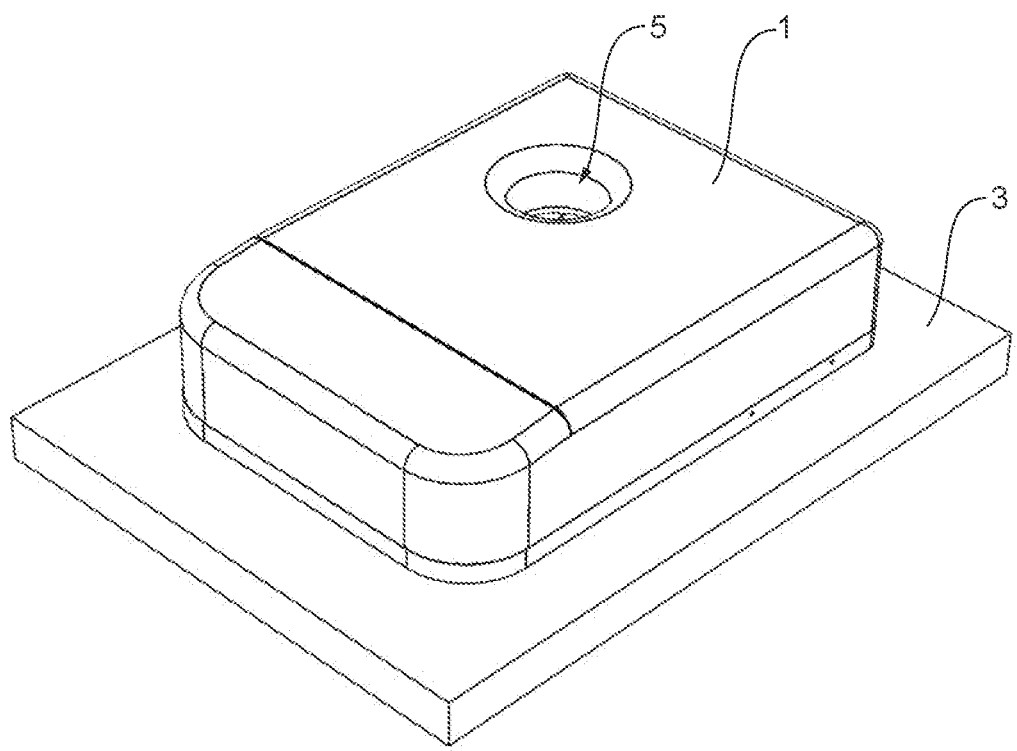
FIG. 1 depicts a top perspective view of one embodiment of an air conditioning unit of the present disclosure.
Figure 2:
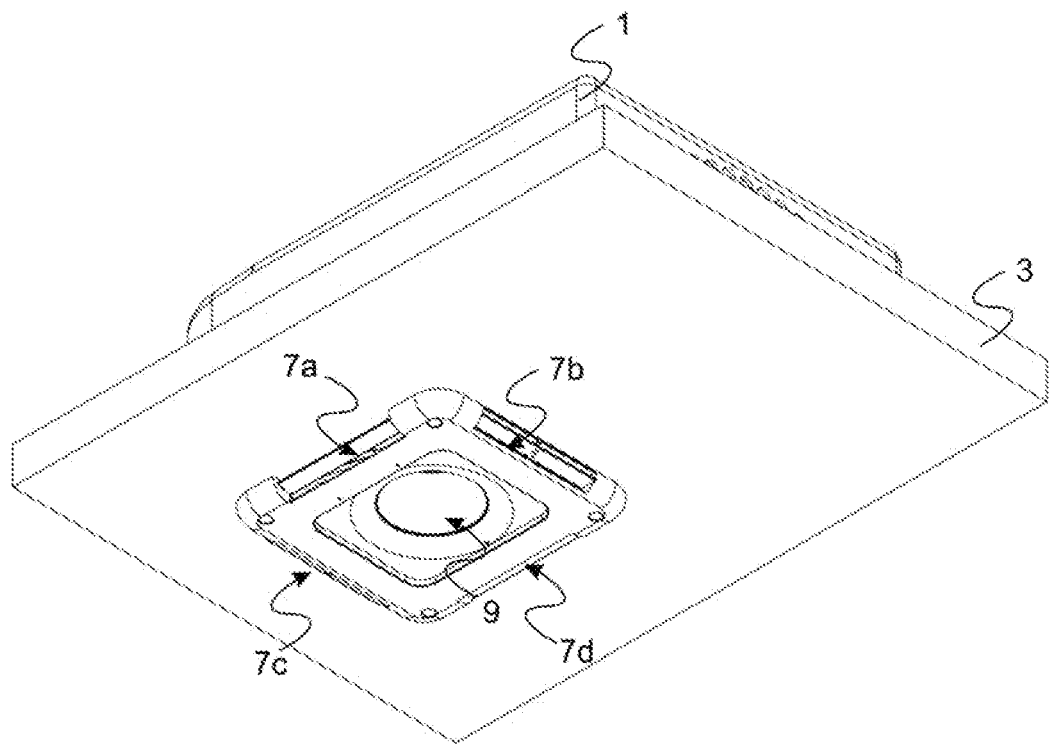
FIG. 2 depicts a bottom perspective view of the embodiment of an air conditioning unit of FIG. 1 of the present disclosure.

With reference to FIGS. 1 and 2, FIG. 1 shows the top perspective view of an air conditioning unit 1 installed on a roof 3 and FIG. 2 shows the bottom perspective view of the air conditioning unit 1 installed on the roof 3. The air conditioning unit has an exterior portion and an interior portion. The exterior portion houses a conditioning chamber, and may also house a condensing system. If it does not house a condensing system, it is connected to a distant condensing system. The condensing system may take many other forms without affecting the functionality of the evaporator part of the air conditioning unit. In the embodiment of FIG. 1, a condensing system is included in the exterior portion with condenser inlet 5 positioned on top of the air conditioning unit 1.

The interior portion comprises the portion of the air conditioning unit below the roof (or inside of a room). In this embodiment, the portion of the air conditioning unit below the roof includes an air inlet/outlet interface (sometimes known as a plenum, a faceplate, or a panel), where the air inlet 9 is positioned in the middle of the air outlet interface 7a, 7b, 7c and 7d. The air inlet 9 allows air to enter the air conditioning unit for air conditioning purposes while the air outlets (7a, 7b, 7c and 7d) allow conditioned air to exit the air conditioning unit. Of course, the air inlet/outlet interface can take many other forms. For example, depending on the types of fans and the direction of air flows, the inlet and outlets can be swapped in position. Also, there may be fewer or more inlet(s) and/or outlets(s). Further, the inlet(s) and outlet(s) may not form a single inlet/outlet interface (i.e. they are separated at a distance away).

Figure 3:
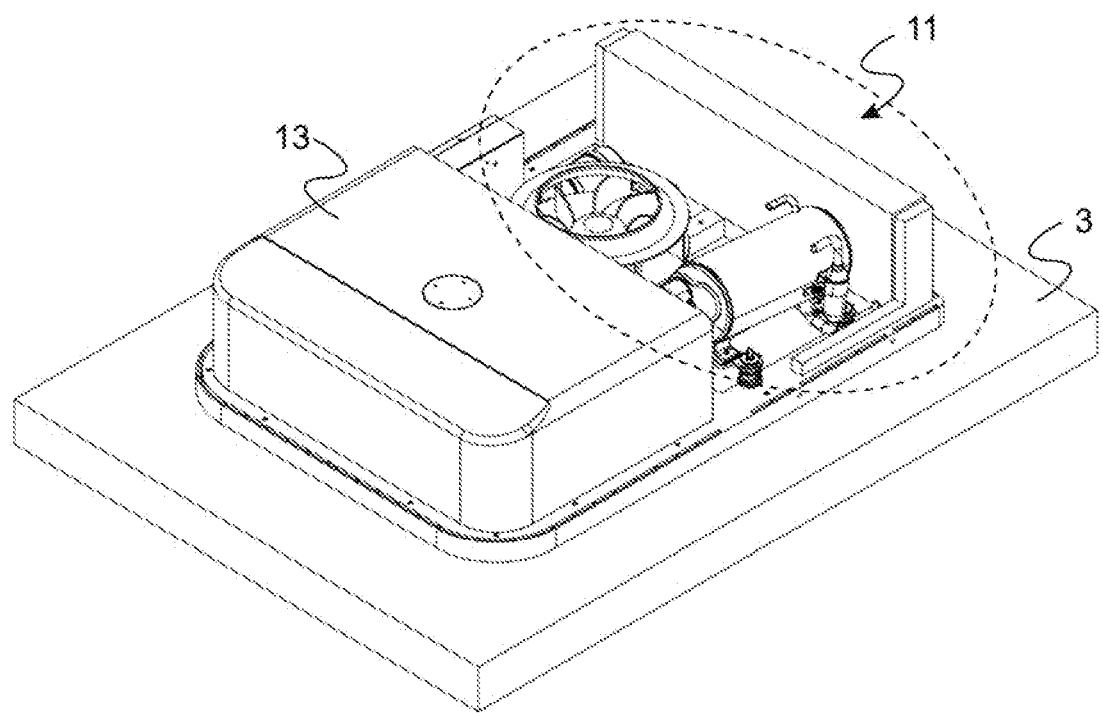
FIG. 3 depicts a top perspective view of the embodiment of an air conditioning unit of FIG. 1 of the present disclosure with the outer casing removed.

FIG. 3 depicts the air conditioning unit of FIG. 1 but with its cover removed. Inside, the condensing system is indicated by 11, which includes condenser fan, a condenser unit for heat transfer and a compressor. Note that what is shown is for illustrative purposes only and the compressor, the condenser unit and the condenser fan may take many other forms. Of course, the condensing system 11 may be distantly located. The evaporative system is indicated by 13, which takes a form of an evaporative chamber.

Figure 4:
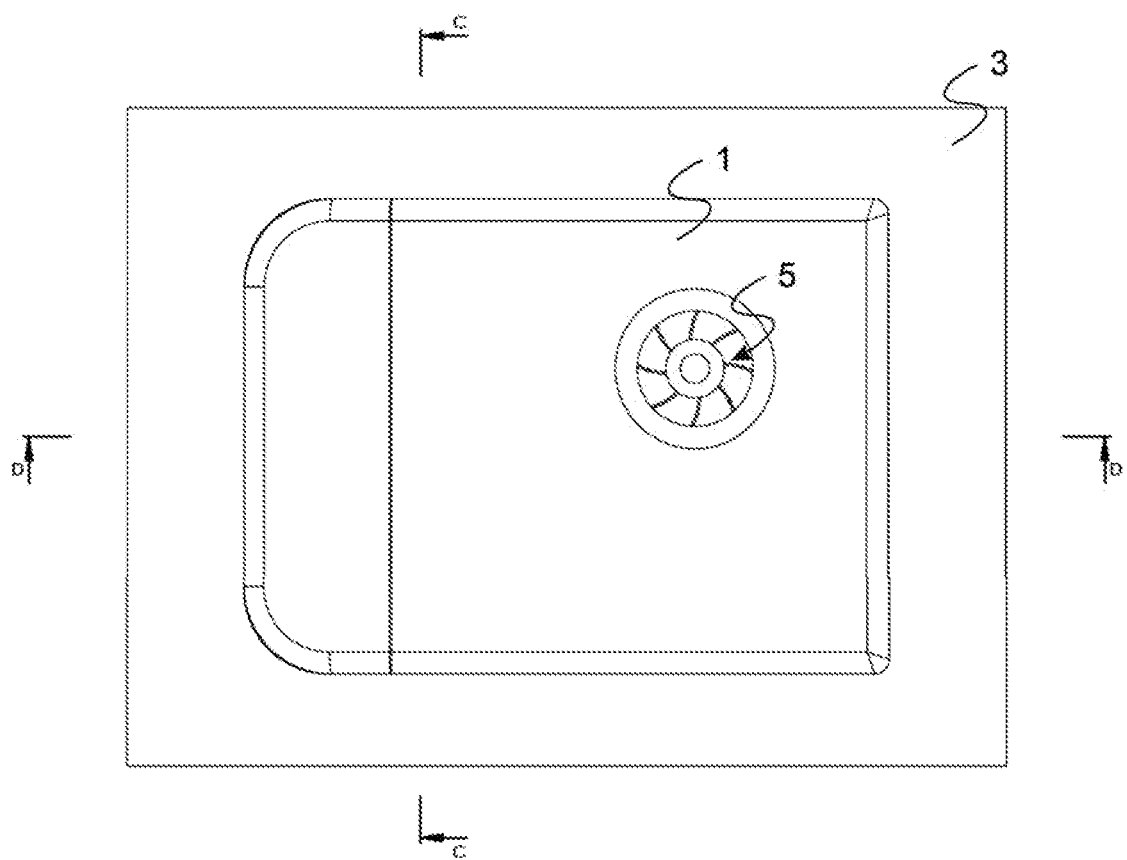
FIG. 4 depicts a top view of the embodiment of an air conditioning unit of FIG. 1 of the present disclosure showing position of two cross sectional areas C-C and D-D.
Figure 5:
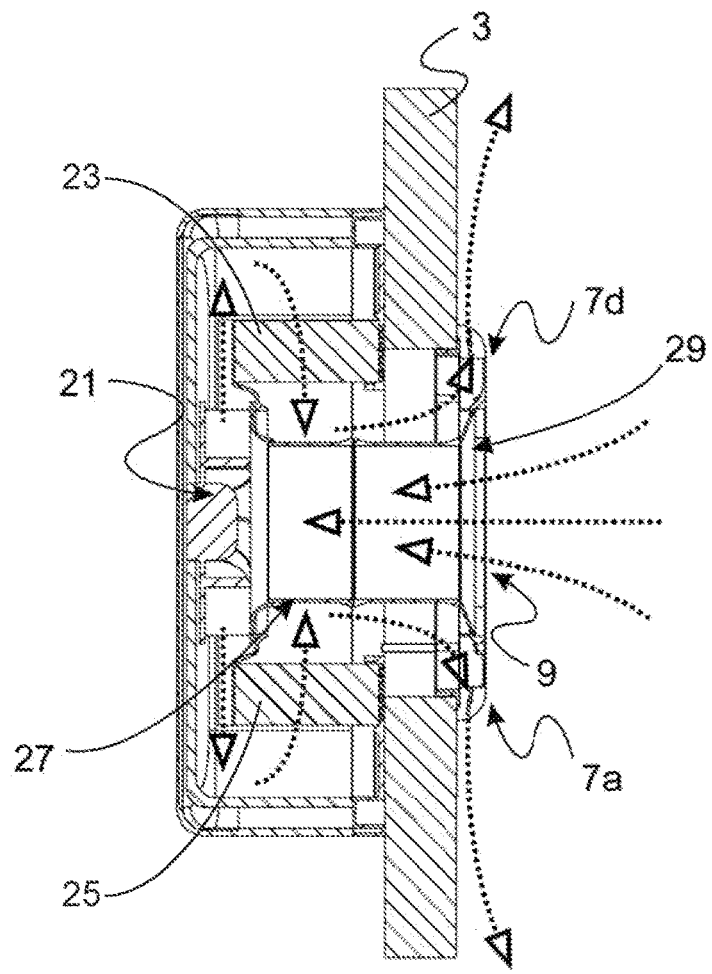
FIG. 5 depicts a cross sectional area C-C of the embodiment of FIG. 1.

FIG. 4 depicts a top view of the embodiment of an air conditioning unit of FIG. 1 of the present disclosure showing position of two cross sectional areas C-C and D-D to explain the evaporative system 13 of FIG. 3. FIG. 5 depicts a cross sectional area C-C of the embodiment of FIG. 1. FIG. 6 depicts a cross sectional area D-D of the embodiment of FIG. 1.

With reference to FIG. 5, the white arrow head and dotted lines indicate an exemplary air flow. The fan (which takes the form of a centrifugal fan 21) draws in air through air inlet 9 then expels air into the evaporative chamber 13, then through evaporative units 23 and 25, and finally ejects air from the evaporative chamber 13 through air outlet interface 7a, 7b, 7c and 7d. As can be observed, the centrifugal fan 21 is not sitting at the base of the evaporative chamber 13. Rather, it is lifted in a way such that the average top surface of the centrifugal fan 21 is higher than the average top surface of the evaporative units 23 and 25. In this way, part or all of the air from the centrifugal fan 21 is not obstructed by the wall between the centrifugal fan 21 and the evaporative units 23 and 25, yet providing an indirect airflow from the centrifugal fan 21 to the evaporative units 23 and 25.

In one form, the centrifugal fan 21 takes the form of a backward inclined (backward-facing or backward-curved) centrifugal fan above the heat exchange coils, the air can be discharged freely without obstruction resulting in a high volume of air discharged at a low noise level. This arrangement also allows for a relatively unobstructed air flow path out of the fan, down to the heat exchange coil and through and then down and discharging out of the plenum 29. Because a backwards inclined centrifugal fan requires a smaller diameter inlet (compared to an axial fan) this results in much more space and therefore lower resistance to air flow between the air outlet interface 7a, 7b, 7c and 7d and the evaporative units 23 and 25, resulting in more airflow volume at a lower noise. It can also be seen that by lifting the centrifugal fan 21, there will be more spaces between the evaporative units 23 and 25, air tunnel 27 and the plenum 29. The space is further increased by having evaporative units 23 and 25 at two sides rather than having evaporative units surrounding the centrifugal fan 21. As can be seen from FIG. 6, the spaces 31a and 31b are much larger than any known art. This configuration has been tested with test results shown later in this disclosure that noise is reduced compared to known prior art.

To maintain the same or comparative conditioning efficiency of the air conditioning unit, the thickness of the evaporative units 23 and 25 are increased to generate a higher sensible heat ratio (SHR) than those thinner units. This means that more of the input power is directed into reducing the temperature of the air than taking water out of the air (latent heat of vaporisation). When compared to other units of the same capacity this unit will deliver more occupant comfort (at the typical rating point/conditions of RV air conditioners).

In other forms, while not optimal, impellers of the centrifugal fan 21 are forward-facing, forward-curved, or straight radial.

Figure 7:
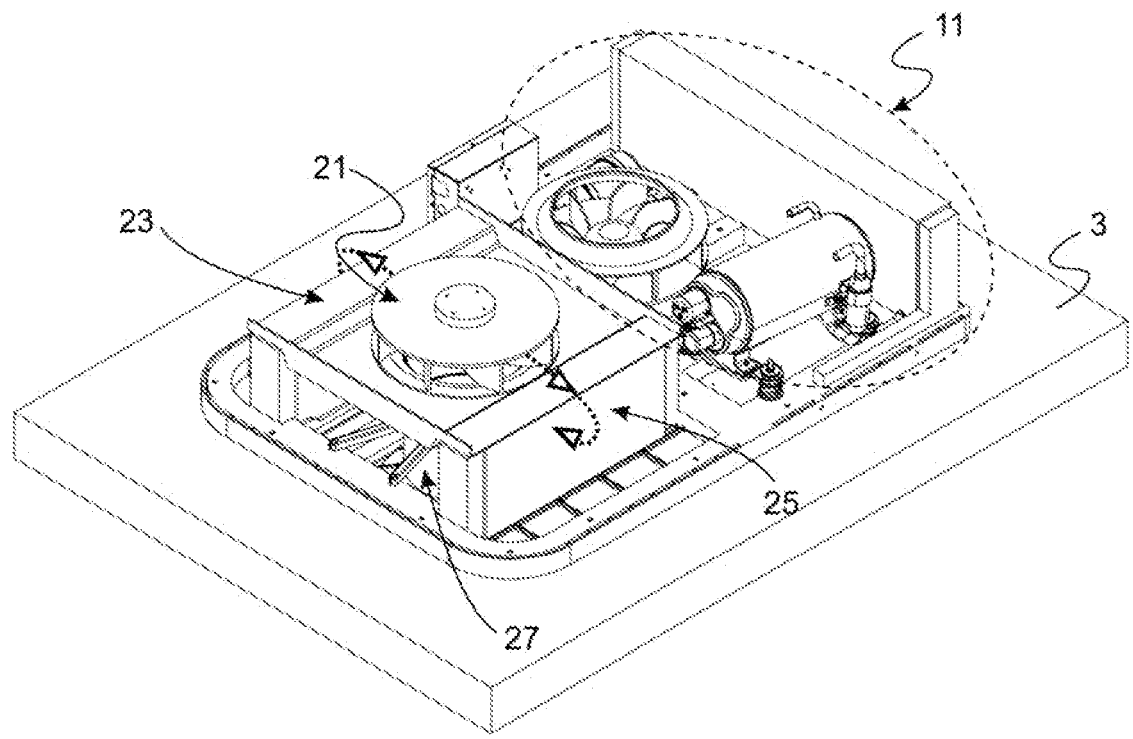
FIG. 7 depicts a top perspective view of the embodiment of an air conditioning unit of FIG. 1 of the present disclosure with the outer casing and the casing of conditioning chamber removed.

FIG. 7 depicts a top perspective view of the embodiment of an air conditioning unit of FIG. 1 of the present disclosure with the outer casing and the casing of conditioning chamber removed. In this embodiment, evaporative units 23 and 25 are positioned at the opposing ends.

In other forms, while not optimal, the evaporative units 23 and 25 may also be U (or n) shape, V shape, two U shapes, two V shapes, or combination of more than one "1" shapes.

The evaporative units 23 and 25 may be a single unit (connected in series or parallel) or it can include one or more independent evaporators (in the sense that each evaporator is powered separately).

Figure 8:
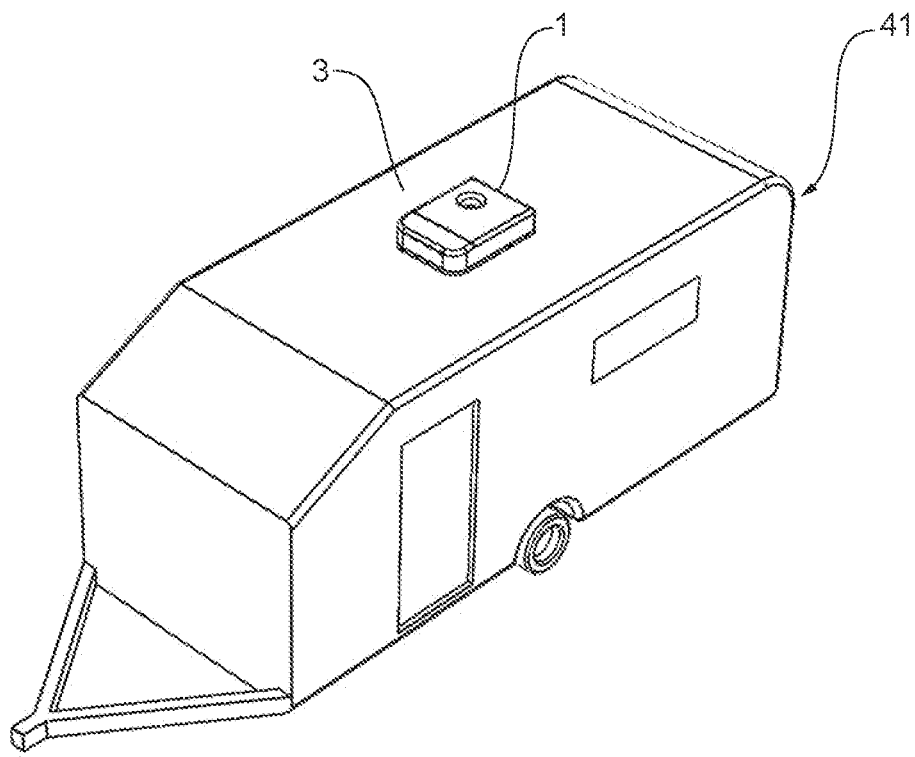
FIG. 8 depicts an application of one embodiment of an air conditioning unit of FIG. 1 of the present disclosure.

FIG. 8 shows an application of one embodiment of the present disclosure on a vehicle. The vehicle shown is a recreation vehicle (RV) 41. An RV usually has either a 360 mm×360 mm or 400 mm×400 mm roof cut-out through which the non-conditioned return air and the air conditioned discharge air both must move through. This limited cut-out size means that any fan must overcome a medium to high static pressure to move the air through.

With reference to FIG. 8, air conditioning 1 may have reinforced casing to protect the conditioning chamber and the condensing system. While strictly not required in an indoor building installation, a casing may be included as well. Outer casing may also be a shell to protect any other components related to this air conditioning unit. For example, in the embodiment of FIGS. 1 to 7, the outer casing may include within itself a compressor, a condenser unit (coil), and a fan for the condenser unit in the condensing system 11. Heat resistance material may also be inserted.

While only shown with simple louvers, more complex louvers, filters and other common accessories may be attached to the plenum 29. For example, louvers and filters may be positioned at the one or more air outlet interfaces to direct the output air at a desired direction or a desired angle or a desired air volume. Louvers can be used to block part of the output aperture too.

While not shown, plenum 29 may include one or more sensors and a remote receiver. The one or more sensors can be used to sense conditions within the room, such as temperature or humidity, to adjust the operation of the air conditioning unit. The remote receiver can be used to receive instructions from a remote control. The remote control can communicate with the remote receiver wirelessly through any known protocol deemed suitable such as infrared, WIFI, Bluetooth etc.

The following are performances of an air conditioning unit following embodiment of FIGS. 1 and 2 as compared to a known product of similar size and type:

| Unit | Product A | Embodiment of FIG. 1 |
|---|---|---|
| Cooling capacity (W) | 2625 | 2400 |
| Rated power input (W) | 1656 | 900-950 |
| Rated current (A) | 6.9 | 4.2 |
| Airflow (l/s) | 52-100 | 60-170 |
| Weight (kg) | 40 | 36-38 |
| Outside volume (length × width × thickness) | 1112 mm × 758 mm × 230 mm | 880 mm × 650 mm × 215 mm |
| Plenum volume (length × width × thickness) | 579 mm × 518 mm × 48 mm | 440 mm × 410 mm × 20-30 mm |
| Maximum noise (dB(A)) | 70 | 70 |

It can be seen that even with a higher conditioned air volume (better output of 170 l/s), the noise generated is comparable with Product A. In other words, a much better volume airflow rate to noise ratio is achieved. Further, the thickness of the plenum is reduced from 48 mm to 20 to 30 mm. When comparing with another known product, the noise generated is more than 5 dB(A) lower at the lower end (i.e. the air conditioning unit is quieter by more than 5 dB(A) when generating low airflow with minimum noise of 48 dB(A)). This is a significant improvement and is noticeable by human ears.

Figure 9:
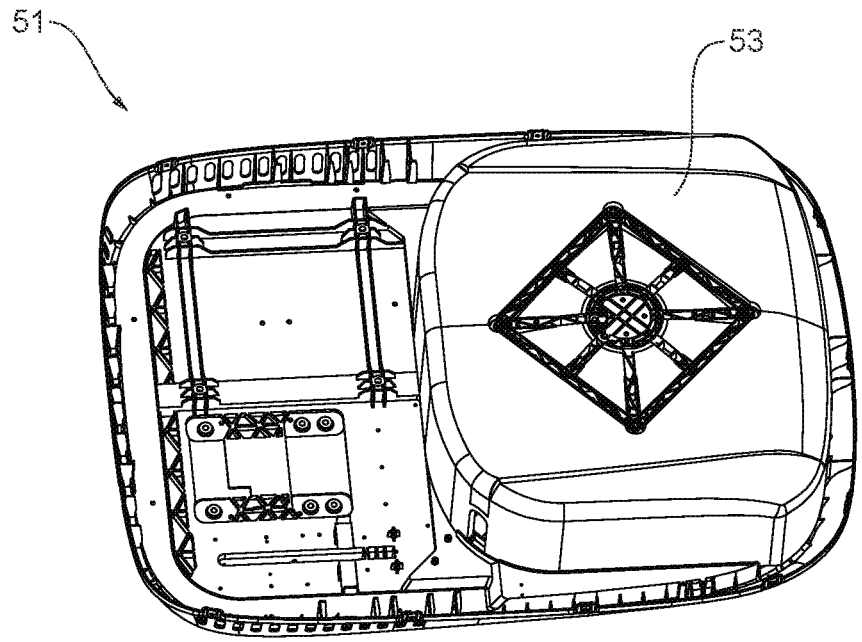
FIG. 9 depicts another embodiment of the present application with the outer casing removed.

FIG. 9 depicts another embodiment of the present application with the outer casing (i.e. the air conditioning unit cover) removed. In particular, the air conditioning unit 51 is without its cover and its condensing system. The condensing system may take the form shown in FIG. 3 or any other form deemed suitable by a person skilled in the art. The condensing system may also be distantly located. The evaporative system takes a form of a conditioning chamber within its casing 53.

Figure 10:
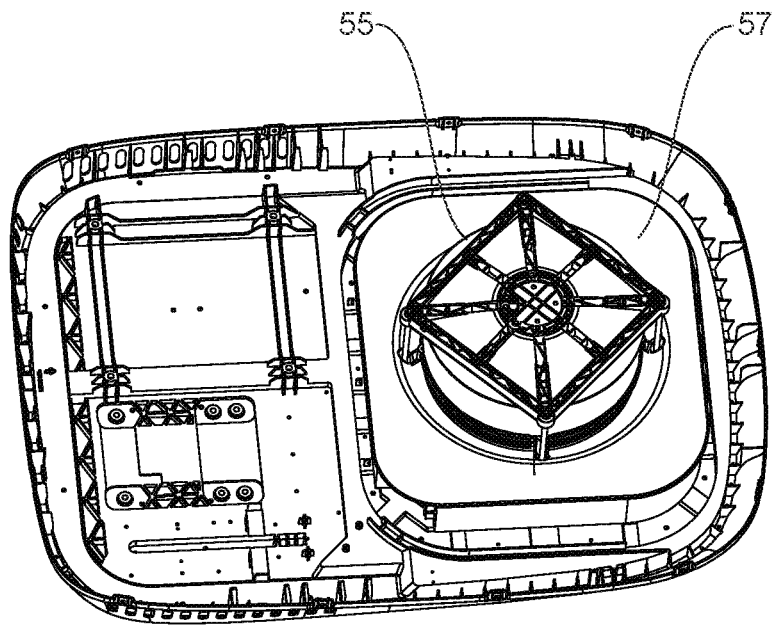
FIG. 10 depicts the embodiment of an air conditioning unit of FIG. 9 of the present disclosure with the outer casing and the casing of conditioning chamber removed.

FIG. 10 depicts the embodiment of an air conditioning unit of FIG. 9 of the present disclosure with the outer casing and the casing 53 of the conditioning chamber removed. With the casing removed, it can be seen that a centrifugal fan 55 protrudes above a barrier 57. The barrier sits on top of the evaporative unit 59 of FIG. 11. The barrier prevents air from the centrifugal fan 55 to hit the evaporative unit 59 directly. The air path will be further explained with respect to FIGS. 12 and 13.

Figure 11:
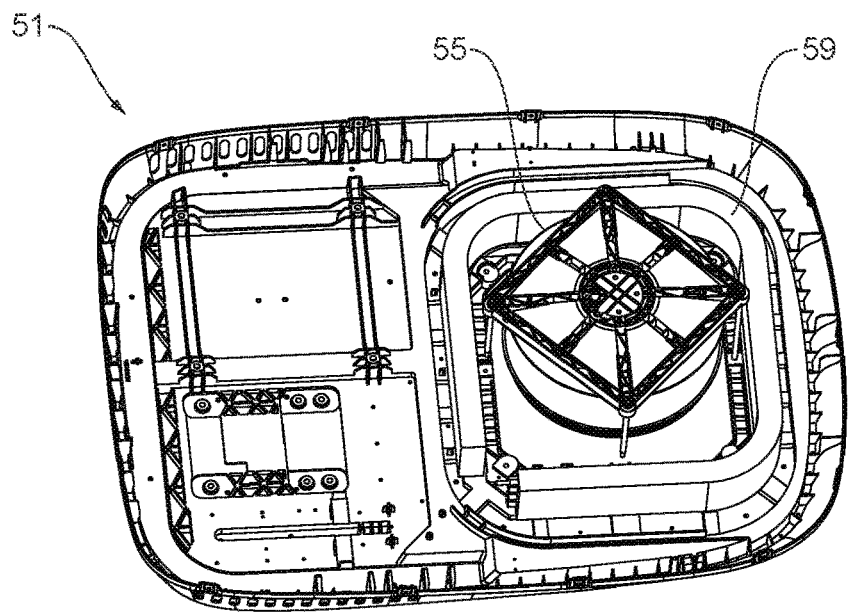
FIG. 11 depicts the embodiment of an air conditioning unit of FIG. 9 of the present disclosure with the outer casing, and the barrier and the casing of conditioning chamber removed.

FIG. 11 depicts the embodiment of an air conditioning unit of FIG. 9 of the present disclosure with the outer casing, and the barrier and the casing of conditioning chamber removed. It can be seen that evaporative unit 59 is below barrier 57.

Figure 12:
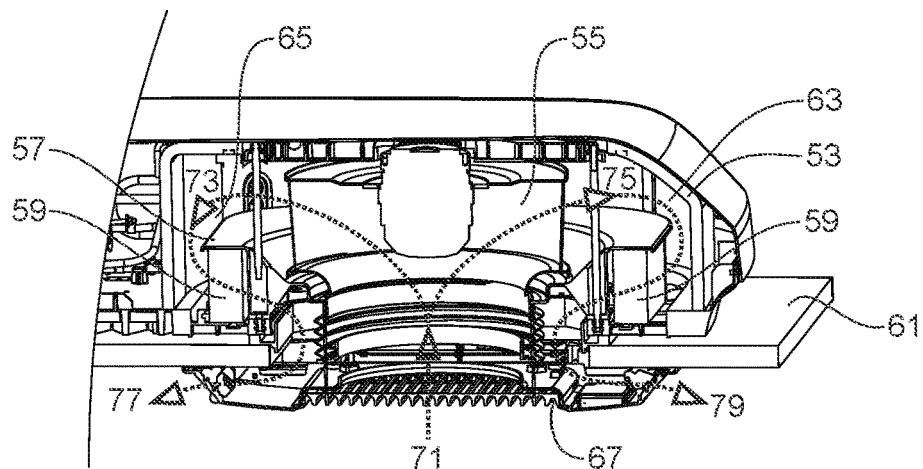
FIG. 12 is a perspective cross-sectional view of the embodiment of FIG. 9, illustrating an exemplary air flow.
Figure 13:
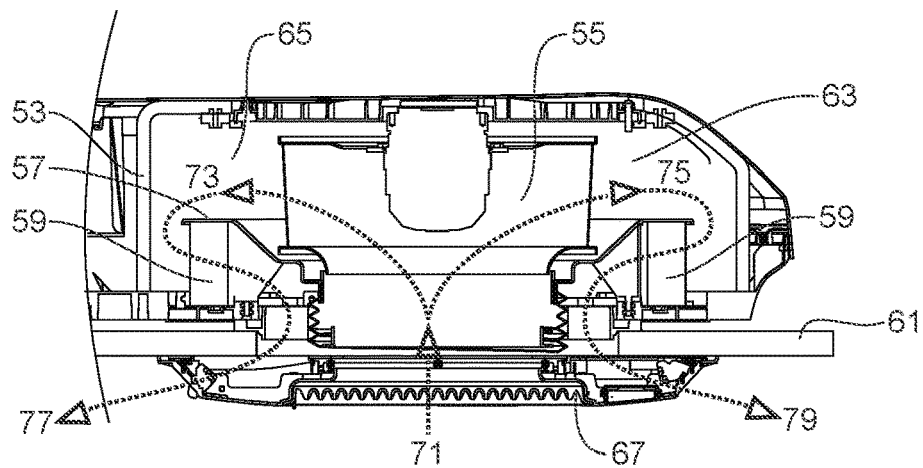
FIG. 13 is a side view of FIG. 12.

FIG. 12 is a perspective cross-sectional view of the embodiment of FIG. 9, illustrating an exemplary air flow to explain the functionality of this air conditioning unit 51 of FIG. 9. FIG. 13 is a corresponding side view of FIG. 12. In both FIGS. 12 and 13, the air conditioning unit 51 is mounted on a ceiling 61. When supplied by power and turned on, the centrifugal fan 55 operates to draw air from outside of the air conditioning unit 51 through air inlet 67 (indicated by arrow 71). The centrifugal fan 55 then ejects the air from the sides of the centrifugal fan 55. As part of the centrifugal fan 55 is above the barrier 57, the air from the centrifugal fan 55 will be ejected to spaces 63, 65 within casing 53. Through air pressure, the air will be directed to move downwards from the edge of the barrier 57, and subsequently, through the air evaporative unit 59 to condition the air, then exit the air conditioning unit 51 through the air outlet (indicated by arrows 71, 73, 77, and 71, 75, 79). Of course, there may be more than two outlets, such as four outlets. The arrows are also merely indicative of an exemplary general air flow directions. Further, air evaporative unit are with small slits or pores to allow air to flow through. It is not shown in the figures, as those slits or pores are many and small.

In summary, the present disclosure presents embodiments based on ingenuity to provide benefits over the prior art.

In a broad form, the present disclosure proposes a lifted fan with an average top surface higher than the average top surface of the evaporative units. In one form, at least 30% of an area of the fan air output is positioned above an average top surface of the evaporative unit. This reduces the air flow noise.

In some embodiments, evaporative units are designed such that they are not completely surrounding the fan such that more space is provided between the evaporative units and the outlets. This further reduces air flow noise. Some embodiments apply counter-intuitive use of short and deep coils with five to six rows. Prior art would have suggested typically to adopt longer coils with fewer rows to reduce pressure drop and increase air flow.

In one particular embodiment, each component is designed so that they fit within a low profile RV air conditioners allowable height of typically 225 mm. The coils of the evaporative units were increased from two or three rows to five or six rows. The coil height was decreased to allow for the backwards inclined centrifugal fan to fit substantially above the coils. The air from the fan is distributed through two separate heat exchange coils into a common pressurised volume which then forces air out of 1 to 4 air outlets in the plenum. The combination of the short, deep, multi-rowed coil and smaller diameter backward inclined centrifugal fan positioned above the coils allowed a larger proportion of the 360 mm square installation hole to be devoted to outlet air flow and reduced overall system resistance. The reduced pressure drop on the outlet side has enabled the further innovation of reduced plenum thickness while still maintaining high air flow and low noise. Deeper five or six row coils also delivered the unexpected benefits of higher sensible cooling ratio i.e. more cold air and less condensate water and also sharp drop in condensate generation when the living space relative humidity drops below 50%. This system of this embodiment with five or more row coils will not continue to dry the air out further which may lead to occupant discomfort.

The term "relative humidity" is an art term to mean the moisture content (i.e. water vapor) of the atmosphere, expressed as a percentage of the amount of moisture that can be retained by the atmosphere (moisture-holding capacity) at a given temperature and pressure without condensation.

The closest prior art AU2017403949 discloses indirect air flow between a fan and evaporative units. While it suggests that the fan may be lifted from the base, all its examples show that the top of the fan is always below the top of the evaporative units even when lifted. This is consistent with the design of this prior art. The wall between the fan and the evaporative units curved away from the centre to promote smooth air flow. Accordingly, one without inventive ingenuity would not have lifted the fan until its top surface is over the top surface of the evaporative units. In other words, the present disclosure teaches away from the closest prior art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. An air conditioning unit, comprising:
   a conditioning chamber;
   a fan, with a fan air input and a fan air output; and
   an evaporative unit, the evaporative unit comprising two separated sets of coils, the two separated sets of coils opposing each other with the fan in between, when viewed from a top of the air conditioning unit, spaces being provided between two sides of the two separated sets of coils, the spaces being below a level of a bottom surface of the fan, and the spaces being configured to lower resistance to air flow between the evaporative unit and the fan air output;
   wherein, the fan and the evaporative unit are arranged in the conditioning chamber;
   wherein, the fan draws in entry air to enter the air conditioning unit, then through the evaporative unit, to condition the entry air to produce conditioned air;
   wherein, within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to being redirected downwards and through the evaporative unit; and
   wherein the fan is a centrifugal fan, and a top of the centrifugal fan touches a top inner surface of the conditioning chamber.

2. The air conditioning unit of claim 1, wherein an average base of the fan is higher than half of an average height of the evaporative unit.

3. The air conditioning unit of claim 1, further comprising an air tunnel and a plenum;
   wherein the air tunnel connects the fan air input to the plenum; the plenum comprises a plenum air input and a plenum air output;
   wherein the entry air goes through the plenum air input to the fan; and wherein the conditioned air goes through the plenum air output as an output of the air conditioning unit.

4. The air conditioning unit of claim 3, wherein a space is provided between the air tunnel and the evaporative unit configured to decrease noise produced by flows of the conditioned air from the evaporative unit towards the plenum air output.

5. The air conditioning unit of claim 4, wherein a thickness of the plenum is reduced to less than 3 cm thick without increasing an overall noise of the air conditioning unit.

6. The air conditioning unit of claim 3, wherein the plenum air output comprises four air outlets, one oriented in a direction facing away from each side of the air conditioning unit.

7. The air conditioning unit of claim 1, wherein the evaporative unit is fitted with evaporative coils surrounding at least 75% the fan when viewed from a top of the air conditioning unit.

8. The air conditioning unit of claim 1, wherein the evaporative unit comprises two separated sets of coils.

9. The air conditioning unit of claim 8, wherein the two separated sets of coils are opposing each other with the fan in between, when viewed from a top of the air conditioning unit.

10. The air conditioning unit of claim 1, wherein the evaporative unit comprises a coil of five or more rows configured to reduce condensate generation when a relative humidity of the entry air drops below 50%.

11. The air conditioning unit of claim 1, wherein at least part of the air from the fan air output is directed towards the wall of the conditioning chamber directly prior to being redirected downwards and through the evaporative unit.

12. An air conditioning unit of a vehicle, comprising:
    a conditioning chamber mounted on top of a ceiling the vehicle;
    a fan, with a fan air input and a fan air output;
    an evaporative unit, the evaporative unit comprising two separated sets of coils, the two separated sets of coils opposing each other with the fan in between, when viewed from a top of the air conditioning unit, spaces being provided between two sides of the two separated sets of coils, the spaces being below a level of a bottom surface of the fan, and the spaces being configured to lower resistance to air flow between the evaporative unit and the fan air output;
    an air tunnel; and
    a plenum mounted at a bottom of the ceiling;
    wherein, the fan and the evaporative unit are arranged in the conditioning chamber;
    wherein, the fan draws in entry air to enter the air conditioning unit, then through the evaporative unit, to condition the entry air to produce conditioned air;
    wherein, within the conditioning chamber, the fan is positioned and configured such that at least 30% of an area of the fan air output are positioned above an average top surface of the evaporative unit, and that air from the at least 30% of the area of the fan air output is directed towards a wall of the conditioning chamber prior to redirected downwards and through the evaporative unit;
    wherein the fan is a centrifugal fan, and wherein a top of the centrifugal fan touches a top inner surface of the conditioning chamber;
    wherein the air tunnel connects the fan air input to the plenum; the plenum comprises a plenum air input and a plenum air output; and
    wherein the entry air goes through the plenum air input to the fan, and the conditioned air goes through the plenum air output as an output of the air conditioning unit.

13. The air conditioning unit of claim 12, wherein the evaporative unit comprises coils with five or more rows configured to reduce condensate generation when a relative humidity of the entry air drops below 50%.

* * * * *